Sept. 14, 1954
O. NUEBLING
2,688,927
CONTROL VALVE FOR A HYDRAULIC APPARATUS
Filed Sept. 5, 1951
3 Sheets-Sheet 1
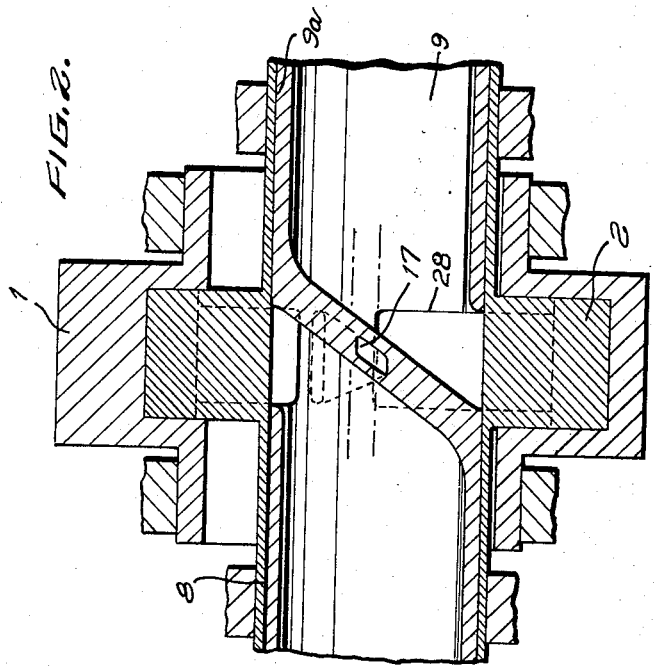
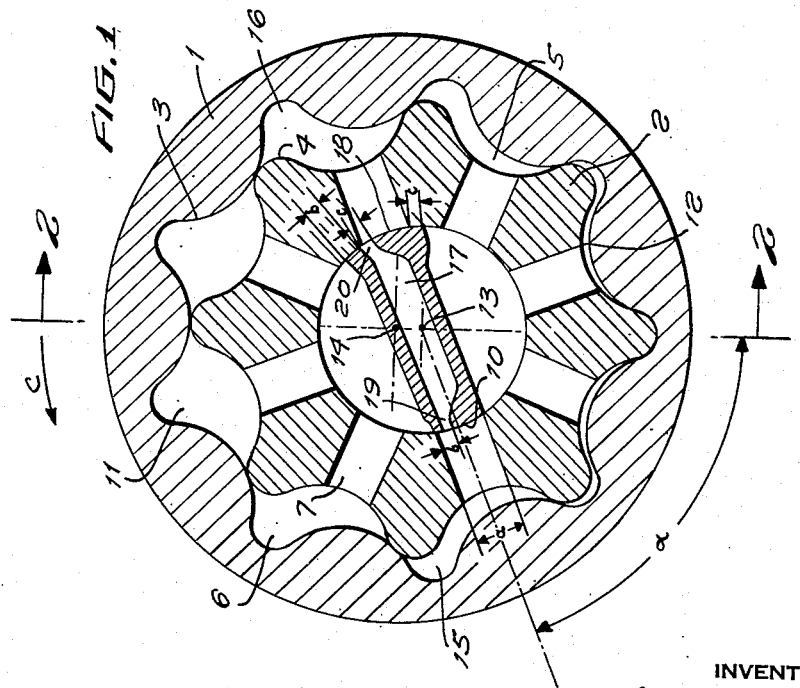
INVENTOR
OTTO NUEBLING
BY

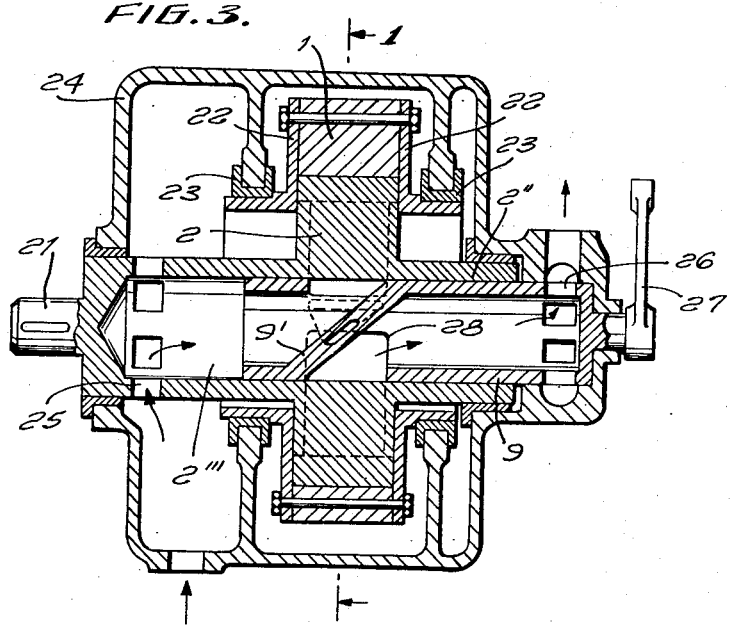

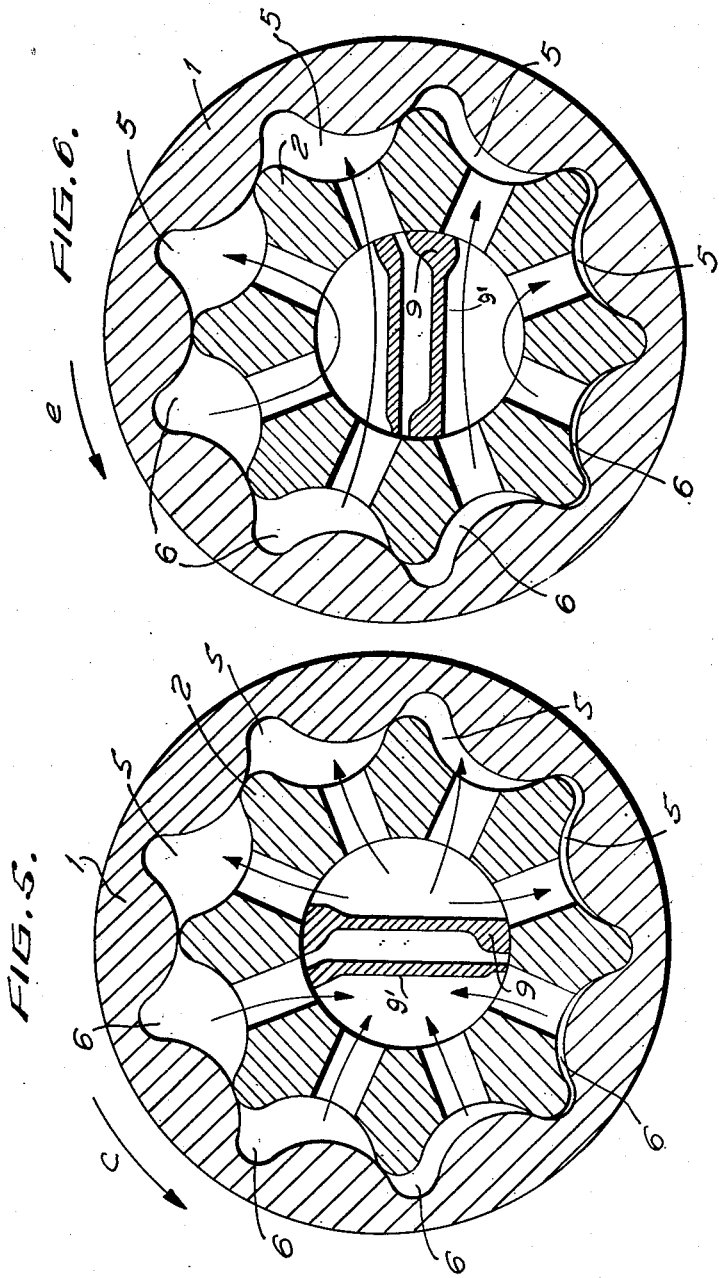

Patented Sept. 14, 1954

2,688,927

UNITED STATES PATENT OFFICE 2,688,927

CONTROL VALVE FOR A HYDRAULIC APPARATUS

Otto Nuebling, Bremen-Huchting, Germany

Application September 5, 1951, Serial No. 245,183

Claims priority, application Germany September 7, 1950

6 Claims. (Cl. 103—41)

The present invention relates to a control valve for hydraulic gear pumps and engines, and more particularly to a control valve provided with a passage preventing excessive pressure in a chamber covered by the sealing face of the control valve.

It is an object of the present invention to provide a control valve for hydraulic gear pumps and engines which permits adjustment of the output of the hydraulic apparatus.

It is another object of the present invention to provide a channel in a control valve for a gear pump by which excessive pressure in a chamber of the gear pump covered by a sealing face of the control valve is prevented.

It is a further object of the present invention to provide a sealing face of the control valve having an increased width whereby undesired communication between pressure and discharge side of the gear pump is prevented in intermediate positions of the control valve.

With these objects in view the present invention mainly consists in a hydraulic apparatus including a casing, a hollow inner member rotatably mounted in the casing and having teeth on its perimeter defining a plurality of depressed portions thereon, the hollow inner member having an inner chamber bounded by a cylindrical surface and being formed with a plurality of radially extending conduits connecting each of the depressed portions with the inner chamber in the hollow inner member and forming slots in the inner cylindrical surface, and an annular outer member rotatably mounted in the casing eccentrically with respect to the hollow inner member and surrounding the same, the outer annular member having a plurality of inner teeth defining depressed portions on its inner surface and meshing with the teeth on the hollow inner member whereby the depressed portions of the inner and outer members form chambers successively increasing in volume on one side of the hollow inner member and decreasing in volume on the other side of the hollow inner member during each revolution and in combination therewith in a tubular control valve, turnably mounted in the casing extending into the inner chamber in the hollow inner member tightly fitting therein turnably with respect to the same between two positions normal to each other, the tubular control valve including an inner transversal wall located in the region of the conduits and dividing the interior of the tubular control valve into two tubular sections, each tubular section formed with an opening in the region of the conduits for supplying and discharging, respectively, a liquid to the conduits, the inner transversal wall having diametrically arranged free edge portions extending substantially parallel to the axis of the tubular control valve and provided with diametrically located sealing faces flush with the outer surface of the tubular control valve, separating the openings in the two tubular sections and permanently abutting against the cylindrical inner surface of the hollow inner member in the region of the conduits, the sealing faces adapted to cover opposite slots formed in the inner cylindrical surface by opposite conduits, the transversal wall being formed with an internal channel terminating in the sealing faces and adapted to establish communication between two opposite chambers, the internal channel forming in the sealing faces narrow slots extending in axial direction of the hollow inner member for substantially the same distances as the slots formed by the conduits in the inner cylindrical surface of the hollow inner member so as to permit liquid to flow from a chamber decreasing in volume to an opposite chamber increasing in volume while the sealing faces of the transversal wall cover the conduits corresponding to the last-mentioned chambers whereby excessive pressure in the last-mentioned chamber decreasing in volume is prevented.

Excessive pressure in a chamber decreasing in size whose corresponding conduit is covered by a sealing face is prevented by the internal channel which permits a communication of the closed pressure chamber with the opposite suction chamber.

According to a preferred embodiment of the present invention the control valve is provided with sealing faces having at least the axial length of the slots formed by the conduits in the inner cylindrical surface, the sealing faces being movable from a position parallel to the plane through the axes of the inner member and the outer annular member to a position normal thereto, one of the sealing faces being located during turning of the tubular control valve on the side of the hollow inner member on which chambers of decreasing volume are formed, and the other of the sealing faces being located during turning of the tubular control valve on the side of the hollow inner member on which increasing chambers are formed, the one of the sealing faces having substantially the same width as the slots formed in the cylindrical surface by the conduits, and the other of the sealing faces having a width greater than the width of the slots formed in the cylindrical surface by the conduits, its width being increased by the width of the narrow slot in the one of the sealing faces and by the distance of one axially extending edge of the last-mentioned narrow slot from the axially extending edge of the one of the sealing faces located adjacent to the other axially extending edge of the last-mentioned narrow slot. This arrangement prevents an undesired communication between pressure and suction side of the gear pump in intermediate positions of the control valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a cross-sectional view of a hydraulic gear pump provided with a control valve according to a preferred embodiment of the present invention taken on line 1—1 in Fig. 3;

Fig. 2 is a partial longitudinal sectional view of a hydraulic gear pump taken on line 2—2 in Fig. 1;

Fig. 3 is a longitudinal sectional view of a hydraulic gear pump;

Fig. 4 is a cross-sectional view similar to Fig. 1;

Fig. 5 is a cross-sectional view taken on line 1—1 in Fig. 3 showing the control valve in the position of maximal output; and Fig. 6 is a cross-sectional view taken on line 1—1 in Fig. 3 showing the control valve in a position in which the liquid circulates within the pump.

Referring now to the drawings, Fig. 3 shows a hollow inner member 2 rotatably mounted in a casing 24. Surrounding the inner member 2 and arranged eccentrically thereto is an outer annular member 1 which is also rotatably mounted in casing 24 by means of end members 22 in bearings 23. The inner member 2 is provided with a shaft end portion 21 to which driving means may be connected if the hydraulic apparatus serves as a pump. Openings 25 are provided at the ends of the hub portions 2', 2" of the inner member, and during operation a liquid enters through the openings 25 into the inner chamber 2''' in the hollow inner member, and is discharged through the openings 26 in the tubular control valve 9. The tubular control valve 9 is divided by an internal transversely extending wall 9' into a left and a right tubular section. Each tubular section is provided with an opening 28, extending nearly for half the periphery of the tubular control valve diametrically opposite the other opening 29. A liquid entering through openings 25 is supplied to the inner rotatable member 2 through the opening 28 in the left tubular section and is discharged after passing through the chambers between the outer and inner members 1, 2 through the opening 28 in the right tubular section. The tubular control valve 9 is turnably mounted in the casing 24 and is manually turnable by means of the handle 27.

The shape and the operation of the inner hollow member 2 and the outer annular member 1 are more clearly shown in Fig. 1. The inner member 2 is provided on its perimeter with a plurality of teeth 4 meshing with inner teeth 3 on the outer annular member 1. The axis 14 of the outer annular member 1 is arranged eccentrically to the axis 13 of the inner member 2. The number of teeth of the hollow inner member 2 is one less than the number of teeth of the outer annular member 1. The inner member 2, when rotated, drives the eccentrically mounted outer member 1. The depressed portions between the teeth of the inner and outer members form together chambers 5 and 6. When the two gear wheels are rotated in the direction of the arrow C, the volume of the chambers 5 on the right side of Figs. 1, 5 and 6 is increased, while the volume of the chambers 6 on the left side is decreased during each revolution. The variations of the chamber volumes depend on the position of the chamber with respect to the axes 13 and 14. The change of volume of the chambers is smaller while passing through the plane extending through the axes 13, 14, and greatest in a position normal thereto. Conduits 7 connect each chamber 5, 6 with the cylindrical surface of the inner chamber of the hollow inner member 2. The tubular control valve 9 extends in the inner chamber of the hollow inner member 2 engaging the sealing surface 8 with the sealing surface 9a, see Fig. 2, and its openings 28 are arranged in the region of the conduits 7. The internal transversal wall 9' of the tubular control valve has a twisted shape so that its free edge portions which separate the openings 28 from each other appear straight in the cross-sectional views.

If the tubular control valve is in the position shown in Fig. 5, the hydraulic apparatus has the greatest possible output, all chambers 5 on the right side sucking the liquid through the conduits 7, openings 28 in the tubular valve 9, and the opening 25 in the hub section 2' of the inner member 2, and all chambers 6 pressing the liquid through the conduits 7, the second opening 28 in the tubular control valve, and out of the openings 26. In the position shown in Fig. 6, however, the tubular control valve is turned for an angle of 90° and as a result correspondent suction and pressure chambers on the right and left sides of the pump are connected, and the liquid circulates only in the interior of the pump.

The width $a$ of the sealing face 10 of the control valve 9 is preferably equal to the width of the slots formed by the conduits 7 on the cylindrical surface of the inner chamber of the hollow inner member. If the sealing face were narrower, unused liquid would flow from the pressure side to the suction side. If the sealing face were wider, the liquid would be temporarily prevented from being discharged from the chambers.

If the width $a$ of the sealing faces is equal to the width of the conduit slots, the hydraulic apparatus operates satisfactorily when the control valve 9 is in the position of maximum output, as shown in Fig. 5, since in this position the sealing faces are arranged on a plane passing through the axes 13 and 14, and the chambers closed by the sealing faces are in a position in which their volume does not change.

If the control valve 9 is turned into the position shown in Fig. 1, the chambers are separated according to the turning angle $\alpha$. In this position chamber 15 decreases in volume during a short period of time while being closed by the sealing face 10 of the control valve. The diametrically oppositely arranged chamber 16 will have negative pressure since it is closed by sealing face 18, and no liquid can be supplied thereto.

As a consequence thereof, excessive pressure may develop in chamber 15 by which the hydraulic apparatus could be damaged.

This disadvantage is overcome in the construction according to the present invention. The control valve 9 is provided with an internal channel 17 in the transversal wall 9' which terminates in slots 19, 20 in the sealing faces 10, 18. Slots 19, 20 have substantially the same axial length as the slots formed by the conduits 7 in the cylindrical inner surface of inner member 2, but are much narrower. The chambers 15 and 16 communicate through channel 17 while the internal transversal wall 9' of the tubular control valve 9 is in a position in which its sealing faces 10, 18 cover conduits 7 corresponding to the chambers 15 and 16.

If both sealing faces of the transversal wall 30, Fig. 4, of the tubular control valve 9 are of the same width as the conduit slots, an undesired communication between pressure chambers 6 and suction chambers 5 may take place through inlet port 31, channel 17 and outlet port 33 in intermediate positions of the tubular control valve as shown in Fig. 4. Reference numerals 3a, 4a, 5a, 6a, 7a, 9a, 11a, 15a and 16a designate in Fig. 4 elements indicated by reference numerals 3, 4, 5, 6, 7, 9, 11, 15 and 16 in other figures.

In order to overcome this disadvantage the sealing faces of the transversal wall 9' Figs. 5 and 6, of the tubular control valve 9 are preferably of different widths. While the width of the sealing face 10 on the pressure side is equal to the width of the slots formed by conduits 7 in the inner cylindrical surface of the inner chamber 2''' of the hollow inner member 2, the sealing face 18 on the suction side is preferably of increased width, and in order to avoid any undesired communication between pressure and suction sides, the width of the sealing face 18 must be increased by the distance b between the inner edge of the slot 19 and the outer edge of the sealing face 10, and further increased by the width c of the slots 19, 20 formed by the channel 17 in the sealing faces 10, 18. If the width of the sealing face 18 is increased by the distances b and c, no undesired communication between pressure and suction side can take place in any position of the control valve, while any excessive pressure in the chamber 15 which is closed in the position of the tubular control valve shown in Fig. 1 is avoided by communication of chamber 15 through the channel 17 with the chamber 16.

It will be understood that each of the elements described above, or two or more together, may also find a useful application in other types of hydraulic apparatus differing from the types described above.

While the invention has been illustrated and described as embodied in a control valve provided with a passage preventing excessive pressure in a closed chamber of the hydraulic apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hydraulic apparatus including a casing, a hollow inner member rotatably mounted in said casing and having teeth on its perimeter defining a plurality of depressed portions thereon, said hollow inner member having an inner chamber bounded by a cylindrical surface and being formed with a plurality of radially extending conduits connecting each of said depressed portions with said inner chamber in said hollow inner member, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a tubular control valve turnably mounted in said casing extending into said inner chamber in said hollow inner member tightly fitting therein, said tubular control valve including an inner transversal wall located in the region of said conduits and dividing said tubular control valve into two tubular sections, each tubular section formed with an opening in the region of said conduits for supplying and discharging, respectively, a liquid to said conduits, each opening extending for nearly half of the periphery of said tubular control valve opposite the opening in the other of said two tubular sections, said openings being located on opposite sides of said inner transversal wall, said inner transversal wall having diametrically arranged free edge portions extending substantially parallel to the axis of said tubular control valve and provided with diametrically located sealing faces flush with the outer surface of said tubular control valve, separating said openings in said two tubular sections and permanently abutting against said cylindrical inner surface of said hollow inner member in the region of said condiuts, said sealing faces adapted to cover opposite conduits during rotation of said inner and outer members, said transversal wall being formed with an internal channel terminating in said sealing faces and adapted to establish communication between a contracting and an expanding chamber when said sealing faces cover the conduits associated with said last mentioned chambers.

2. In a hydraulic apparatus including a casing, a hollow inner member rotatably mounted in said casing and having teeth on its perimeter defining a plurality of depressed portions thereon, said hollow inner member having an inner chamber bounded by a cylindrical surface and being formed with a plurality of radially extending conduits connecting each of said depressed portions with said inner chamber in said hollow inner member, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a tubular control valve turnably mounted in said casing extending into said inner chamber in said hollow inner member tightly fitting therein, turnably with respect to the same between two positions normal to each other, said tubular control valve including an inner transversal wall located in the region of said conduits and dividing said tubular control valve into two tubular sections, each tubular section formed with an opening in the region of said conduits for supplying and discharging, respectively, a liquid to said conduits, said inner transversal wall having diametrically arranged free edge portions extending substantially parallel to the axis of said tubular control valve and provided with diametrically located sealing faces flush with the outer surface of said tubular control valve, separating said openings in said two tubular sections and permanently abutting against said cylindrical inner surface of said hollow inner member in the region of said conduits, said sealing faces adapted to cover opposite conduits, said transversal wall being formed with an internal channel terminating in said sealing faces and adapted to establish communication between two opposite chambers so as to permit liquid to flow from a chamber decreasing in volume to an opposite chamber increasing in volume while said sealing faces of said transversal wall cover the conduits corresponding to said last-mentioned chambers whereby excessive pressure in said last-mentioned chamber decreasing in volume is prevented.

3. In a hydraulic apparatus including a casing, a hollow inner member rotatably mounted in said casing and having teeth on its perimeter defining a plurality of depressed portions thereon, said hollow inner member having an inner chamber bounded by a cylindrical surface and being formed with a plurality of radially extending conduits connecting each of said depressed portions with said inner chamber in said hollow inner member and forming slots in said inner cylindrical surface, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a tubular control valve turnably mounted in said casing extending into said inner chamber in said hollow inner member tightly fitting therein turnably with respect to the same between two positions normal to each other, said tubular control valve including an inner transversal wall located in the region of said conduits and dividing said tubular control valve into two tubular sections, each tubular section formed with an opening in the region of said conduits for supplying and discharging, respectively, a liquid to said conduits, said inner transversal wall having diametrically arranged free edge portions extending substantially parallel to the axis of said tubular control valve and provided with diametrically located sealing faces flush with the outer surface of said tubular control valve, separating said openings in said two tubular sections and permanently abutting against said cylindrical inner surface of said hollow inner member in the region of said conduits, said sealing faces adapted to cover opposite slots formed in said inner cylindrical surface by opposite conduits, said transversal wall being formed with an internal channel terminating in said sealing faces and adapted to establish communication between two opposite chambers, said internal channel forming in said sealing faces narrow slots extending in axial direction of said hollow inner member for substantially the same distance as said slots formed by said conduits in said inner cylindrical surface of said hollow inner member so as to permit liquid to flow from a chamber decreasing in volume to an opposite chamber increasing in volume while said sealing faces of said transversal wall cover the conduits corresponding to said last-mentioned chambers whereby excessive pressure in said last-mentioned chamber decreasing in volume is prevented.

4. In a hydraulic apparatus including a casing, a hollow inner member rotatably mounted in said casing and having teeth on its perimeter defining a plurality of depressed portions thereon, said hollow inner member having an inner chamber bounded by a cylindrical surface and being formed with a plurality of radially extending conduits connecting each of said depressed portions with said inner chamber in said hollow inner member and forming slots in said inner cylindrical surface, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a tubular control valve turnably mounted in said casing extending into said inner chamber in said hollow inner member tightly fitting therein turnably with respect to the same between two positions normal to each other, said tubular control valve including an inner transversal wall located in the region of said conduits and dividing said tubular control valve into two tubular sections, each tubular section formed with an opening in the region of said conduits for supplying and discharging, respectively, a liquid to said conduits, said inner transversal wall having diametrically arranged free edge portions extending substantially parallel to the axis of said tubular control valve and provided with diametrically located sealing faces flush with the outer surface of said tubular control valve, separating said openings in said two tubular sections and permanently abutting against said cylindrical inner surface of said hollow inner member in the region of said conduits, said transversal wall being formed with an internal channel terminating in said sealing faces and adapted to establish communication between two opposite chambers, said internal channel forming in said sealing faces narrow slots extending in axial direction of said hollow inner member for substantially the same distance as said slots formed by said conduits in said inner cylindrical surface of said hollow inner member so as to permit liquid to flow from a chamber decreasing in volume to an opposite chamber increasing in volume while said sealing faces of said transversal wall cover the conduits corresponding to said last-mentioned chambers whereby excessive pressure in said last-mentioned chamber decreasing in volume is prevented, said sealing faces being adapted to cover opposite slots formed in said inner cylindrical surface by opposite conduits and having at least the axial length of said slots formed by said conduits in said inner cylindrical surface, said sealing faces being movable from a position parellel to the plane through the axis of said inner member and said outer annular member to a position normal thereto, one of the sealing faces being located during turning of said tubular control valve on the side of said hollow inner member on which chambers of decreasing volume are formed, and the other of said sealing faces being located during turning of said tubular control valve on the side of said hollow inner member on which increasing chambers are formed, said one of said sealing faces having substantially the same width as said slots formed in said cylindrical surface by said conduits, and said other of said sealing faces having a width greater than the width of said slots formed in said cylindrical surface by said conduits.

5. In a hydraulic apparatus including a casing, a hollow inner member rotatably mounted in said casing and having teeth on its perimeter defining a plurality of depressed portions thereon, said hollow inner member having an inner chamber bounded by a cylindrical surface and being formed with a plurality of radially extending conduits connecting each of said depressed portions with said inner chamber in said hollow inner member and forming slots in said inner cylindrical surface, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a tubular control valve turnably mounted in said casing extending into said inner chamber in said hollow inner member tightly fitting therein turnably with respect to the same between two positions normal to each other, said tubular control valve including an inner transversal wall located in the region of said conduits and dividing said tubular control valve into two tubular sections, each tubular section formed with an opening in the region of said conduits for supplying and discharging, respectively, a liquid to said conduits, said inner transversal wall having diametrically arranged free edge portions extending substantially parallel to the axis of said tubular control valve and provided with diametrically located sealing faces flush with the outer surface of said tubular control valve, separating said openings in said two tubular sections and permanently abutting against said cylindrical inner surface of said hollow inner member in the region of said conduits, said transversal wall being formed with an internal channel terminating in said sealing faces and adapted to establish communication between two opposite chambers, said internal channel forming in said sealing faces narrow slots extending in axial direction of said hollow inner member for substantially the same distance as said slots formed by said conduits in said inner cylindrical surface of said hollow inner member so as to permit liquid to flow from a chamber decreasing in volume to an opposite chamber increasing in volume while said sealing faces of said transversal wall cover the conduits corresponding to said last-mentioned chambers whereby excessive pressure in said last-mentioned chamber decreasing in volume is prevented, said sealing faces being adapted to cover opposite slots formed in said inner cylindrical surface by opposite conduits and having at least the axial length of said slots formed by said conduits in said inner cylindrical surface, said sealing faces being movable from a position parallel to the plane through the axes of said inner member and said outer annular member to a position normal thereto, one of the sealing faces being located during turning of said tubular control valve on the side of said hollow inner member on which chambers of decreasing volume are formed, and the other of said sealing faces being located during turning of said tubular control valve on the side of said hollow inner member on which increasing chambers are formed, said one of said sealing faces having substantially the same width as said slots formed in said cylindrical surface by said conduits, and said other of said sealing faces having a width greater than the width of said slots formed in said cylindrical surface by said conduits, its width being increased by the width of the narrow slot in said one of said sealing faces and by the distance of one axially extending edge of said last-mentioned narrow slot from the axially extending edge of said one of said sealing faces located adjacent to the other axially extending edge of said last-mentioned narrow slot.

6. In a hydraulic apparatus including a casing, a hollow inner member rotatably mounted in said casing and having teeth on its perimeter defining a plurality of depressed portions thereon, said hollow inner member having an inner chamber and being formed with a plurality of radially extending conduits connecting each of said depressed portions with said inner chamber in said hollow inner member, and an annular outer member rotatably mounted in said casing eccentrically with respect to said hollow inner member and surrounding the same, said outer annular member having a plurality of inner teeth defining depressed portions on its inner surface and meshing with said teeth on said hollow inner member whereby said depressed portions of said inner and outer members form chambers successively increasing in volume on one side of said hollow inner member and decreasing in volume on the other side of said hollow inner member during each revolution, in combination, a control valve movably mounted in said casing extending into said inner chamber in said hollow inner member tightly fitting therein, said control valve including an inner transversal wall located in the region of said conduits and dividing said control valve into two sections, each section formed with an opening in the region of said conduits for supplying and discharging, respectively, a liquid to said conduits, said inner transversal wall having diametrically arranged free edge portions provided with diametrically located sealing faces flush with the outer surface of said control valve, separating said openings in said two sections and permanently abutting against the inner surface of said hollow inner member in the region of said conduits, said sealing faces adapted to cover opposite conduits during rotation of said inner and outer members, said transversal wall being formed with an internal channel terminating in said sealing faces and adapted to establish communication between a contracting and an expanding chamber when said sealing faces cover the conduits associated with said last mentioned chambers.

References Cited in the file of this patent

UNITED STATES PATENTS

| Number | Name | Date |
|---|---|---|
| 1,341,846 | Gollings | June 1, 1920 |
| 2,011,338 | Hill | Aug. 13, 1935 |
| 2,140,966 | Nichols | Dec. 20, 1938 |

FOREIGN PATENTS

| Number | Country | Date |
|---|---|---|
| 9,359 | Great Britain | 1915 |